United States Patent
Beyfuss et al.

(10) Patent No.: US 10,619,671 B2
(45) Date of Patent: Apr. 14, 2020

(54) ROLLER BEARING CAGE AND METHOD FOR MOUNTING A ROLLER BEARING CAGE

(71) Applicant: AKTIEBOLAGET SKF, Göteborg (SE)

(72) Inventors: Berthold Beyfuss, Wasserlosen-Kaisten (DE); Hans-Juergen Friedrich, Koenigsberg-Roemershofen (DE); Sabine Hofmann, Wuerzburg (DE); Holger Kristandt, Euerbach (DE); Alfred Radina, Poppenlauer (DE); Jonas Schierling, Hassfurt (DE); Gerhard Wagner, Prichsenstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 379 days.

(21) Appl. No.: 15/129,132

(22) PCT Filed: Mar. 20, 2015

(86) PCT No.: PCT/EP2015/055924
§ 371 (c)(1),
(2) Date: Sep. 26, 2016

(87) PCT Pub. No.: WO2015/144582
PCT Pub. Date: Oct. 1, 2015

(65) Prior Publication Data
US 2017/0108044 A1    Apr. 20, 2017

(30) Foreign Application Priority Data
Mar. 28, 2014    (DE) .................. 10 2014 205 817

(51) Int. Cl.
*F16C 33/46* (2006.01)
*F16C 43/04* (2006.01)
(Continued)

(52) U.S. Cl.
CPC ........ *F16C 33/4664* (2013.01); *F16C 19/364* (2013.01); *F16C 33/4694* (2013.01);
(Continued)

(58) Field of Classification Search
CPC .............. F16C 33/4647; F16C 33/4664; F16C 33/4694; F16C 33/548
See application file for complete search history.

(56) References Cited

U.S. PATENT DOCUMENTS 3,399,008 A    8/1968  Farrell et al.
5,033,876 A *  7/1991  Kraus .................. F16C 19/463
                                                    384/572
(Continued)

FOREIGN PATENT DOCUMENTS

DE    604678 C    10/1934
DE    7034212 U   12/1970
(Continued)

*Primary Examiner* — James Pilkington
(74) *Attorney, Agent, or Firm* — Garcia-Zamor Intellectual Property Law, LLC; Ruy Garcia-Zamor; Bryan Peckjian

(57) ABSTRACT

A rolling-element bearing cage includes a first side ring and a second side ring connected to the first side ring by a plurality of bridges defining a plurality of pockets configured to receive a rolling-element. The first side ring includes a joint at which the first side ring is configured to be opened to increase a diameter of the first side ring, and the first side ring and the second side ring and the plurality of bridges are made of steel and an outer diameter of the second side ring is greater than 500 mm.

16 Claims, 12 Drawing Sheets

(51) Int. Cl.
*F16C 33/54* (2006.01)
*F16C 19/36* (2006.01)

(52) U.S. Cl.
CPC ............ *F16C 33/548* (2013.01); *F16C 43/04* (2013.01); *F16C 2226/60* (2013.01); *F16C 2300/14* (2013.01)

(56) References Cited

U.S. PATENT DOCUMENTS

| | | | | |
|---|---|---|---|---|
| 9,039,289 | B2 * | 5/2015 | Fox | F16C 43/04 384/573 |
| 2010/0129022 | A1 * | 5/2010 | Beyfuss | F16C 19/34 384/577 |
| 2011/0255817 | A1 * | 10/2011 | Beyfuss | F16C 33/4664 384/470 |
| 2013/0294718 | A1 | 11/2013 | Fox et al. | |

FOREIGN PATENT DOCUMENTS

| | | | |
|---|---|---|---|
| DE | 3911671 | A1 | 10/1990 |
| DE | 3920689 | A1 | 1/1991 |
| DE | 4112506 | A1 | 10/1992 |
| DE | 10011651 | A1 | 9/2001 |
| DE | 102007020113 | A1 | 10/2008 |
| DE | 102010037331 | A1 | 3/2012 |
| DE | 102011004374 | A1 | 8/2012 |
| DE | 102011079775 | A1 | 1/2013 |
| FR | 2919031 | A1 | 1/2009 |
| GB | 2473880 | A | 3/2011 |
| JP | H10281165 | A | 10/1998 |
| JP | 2009191990 | A | 8/2009 |
| JP | 2010090955 | A | 4/2010 |
| JP | 2013036573 | A | 2/2013 |
| WO | WO2013/180774 | * | 12/2013 |

* cited by examiner

ROLLER BEARING CAGE AND METHOD FOR MOUNTING A ROLLER BEARING CAGE

CROSS-REFERENCE TO RELATED APPLICATIONS

This application is the U.S. National Stage of International Application No. PCT/EP2015/055924 filed on Mar. 20, 2015, which claims priority to German patent application no. 10 2014 205 817.1 filed on Mar. 28, 2014.

TECHNICAL FIELD OF THE PRESENT INVENTION

Exemplary embodiments relate to a rolling-element bearing cage and a method for installing a rolling-element bearing cage.

BACKGROUND OF THE INVENTION

Rolling-element bearing cages are often used for guiding and spacing rolling elements in a rolling-element bearing. A variety of conventional rolling-element bearing cages are known for this purpose. There are conventional rolling-element bearing cages that include two side rings disposed in the circumferential direction. These side rings can be connected to each other via a variety of bridges. A pocket is formed between each two bridges and the side rings. A rolling element can be received in each pocket.

For installing in a rolling-element bearing, such rolling-element bearing cages are usually first fitted with the rolling elements. The rolling-element bearing cage is often first mounted on an inner ring. Many inner rings include a flange. When the rolling-element bearing cage fitted with the rolling elements is then to be mounted on the inner ring including the flange, the rolling elements and the side ring must then be drawn or pushed over the flange. In many cases the flange has a diameter that is larger than a diameter on which the central axis of the rolling elements are held in the rolling-element bearing cage. Therefore many conventional bearing cages are expanded for mounting. For this purpose the closed bearing cage is usually stretched in the radial direction. After the mounting the side ring is contracted again or taken in again. Special tools are usually required for this purpose.

With cages having a large diameter the expanding and taking-in is not possible or possible only with great difficulty. Large rolling-element bearings can have, for example, an outer diameter over 500 mm or even over 1000 mm. Therefore in many conventional large rolling-element bearings, rolling-element bearing cages in a snap-in design are used. Here they can be, for example, so-called H-cages. However, the manufacture of such rolling-element bearing cages can be relatively complex. In addition, the assembly can also be complex or even difficult. Reasons for this can be, for example, a large mass of the cage and the snap-in design.

BRIEF SUMMARY OF THE PRESENT INVENTION

There is therefore a need to provide a concept for improving the installation of a rolling-element bearing cage.

According to one aspect, exemplary embodiments relate to a rolling-element bearing cage that comprises a steel as material. The rolling-element bearing cage has at least one side ring. The side ring extends in a circumferential direction. In some exemplary embodiments a further side ring can be present. Alternatively only a single ring that links the pockets for receiving the rolling elements can also be centrally disposed. This can also be considered as a side ring. The at least one side ring has an opening point. At the opening point the side ring can be opened. Thus a circumference of the side ring can be expanded for an installation of he rolling-element bearing cage; in addition the rolling-element bearing cage has an outer diameter that is greater than 500 mm.

Since the side ring has an opening point, in some exemplary embodiments an installing and a manufacturing of a rolling-element bearing from steel for a large rolling-element bearing can be simplified. Therefore the rolling-element bearing cage can be drawn over a flange or inner-ring flange that has a larger diameter than the side ring in a closed state. Thus in some exemplary embodiments the rolling elements can be correctly positioned in the axial direction adjacent to the flange. In other words, the side ring or the rolling-element bearing cage can be drawn apart or separated at the opening point for installation. Therefore the opening point can optionally also be configured as a separating point. When the side ring is spread apart at the separating point, in some exemplary embodiments a circumferential dimension of the side ring or also of the rolling-element bearing cage can enlarge. A distance between two separation surfaces of the opening point can then also enlarge. For this purpose in some exemplary embodiments a circumference of the side ring need not necessarily change uniformly. A shape of the side ring can change with a spreading apart at the opening point. For example, the shape can change from a circular ring to an oval or another shape. After a closing of the opening point the side ring or the rolling-element bearing cage can again assume its original shape.

In some exemplary embodiments the rolling-element bearing cage can have a diameter that is larger than 500 mm, 600 mm, 700 mm, 800 mm, 1000 mm, 1100 mm, 1200 mm, 1300 mm, 1400 mm, 1500 mm, 1600 mm, 1700 mm, 1800 mm, 2000 mm, 2100 mm, 2200 mm, 2400 mm, 2500 mm, 2700 mm, 2800 mm, 2900 mm, 3000 mm.

In some further exemplary embodiments the opening point is exactly one single opening point. Thus in some exemplary embodiments it can be made possible that the rolling-element bearing cage can fulfill its function as an unsegmented rolling-element bearing cage. Nevertheless in some exemplary embodiments the rolling-element bearing cage can be installed better since it has the opening point. Even if the side ring has a plurality of opening points, these do not separate the rolling-element bearing cage into a plurality of rolling-element bearing cage segments. Furthermore, the side ring can have a tilt- or hinge-region. The tilt- or hinge-region can lie opposite the opening point in the radial direction. Thus in some exemplary embodiments it can be made possible that the side ring can be opened farther at the opening point. This can be important, for example, if the side ring is comprised of a very stiff material. The hinge- or tilt-region can optionally be configured such that it can be more easily deformed than other regions of the side ring. For this purpose the hinge- or tilt-region can comprise, for example, a hinge. Furthermore, the hinge- or tilt-region can also be configured perforated. Additionally or alternatively the hinge- or tilt-region can have a smaller diameter, a lesser thickness, or a lesser height than other regions of the side ring. Additionally or alternatively the hinge- or tilt-region can be formed from a more elastic or softer material than other regions of the side ring.

In an analogous manner to the first side ring the further or second side ring can also have an opening point. Thus in some exemplary embodiments the rolling-element bearing cage can be opened better for installation. The first and the second side ring can be connected to each other, for example, via a plurality of bridges. Between each two bridges a rolling element can possibly be received in a pocket. The pocket can be suited for receiving any type of rolling element. For example, the pockets can be configured to receive a cylindrical roller, a spherical roller, a tapered roller, or a ball. Thus according to some exemplary embodiments the rolling-element bearing cage can be used in a cylindrical roller bearing (e.g., CRB), a spherical roller bearing (e.g., SRB), a ball bearing, or the like.

The opening points of the two side rings can be disposed flush to one another. In other words, the two opening points lie one-over-the-other in the axial direction. Thus the opening points can be disposed at an identical angular position of the two side rings or of the rolling-element bearing cage. Since the opening points of the two side rings are disposed at the same angular position of the rolling-element bearing cage, the two opening points can form a common opening point of the rolling-element bearing cage. Thus in some exemplary embodiments the rolling-element bearing cage can be spread apart and opened at a single opening point.

In some further exemplary embodiments the second side ring has a larger diameter than the first side ring. Thus in some exemplary embodiments the rolling-element bearing cage can be suited for guiding the rolling elements in a tapered roller bearing. In some such exemplary embodiments the second side ring can be configured closed or without separating- or opening-point. Nevertheless the rolling-element bearing cage could then be mounted on the inner ring including the flange. This can be possible, for example, since the second side ring having the larger diameter can also have a larger diameter than the flange of the inner ring. Although it is closed, the second side ring could thus be guided over the flange of the inner ring. The first side ring with the smaller diameter can then be separated at the opening point in order to overcome the flange. Of course the second side ring with the larger diameter can also have an opening point. Alternatively the side rings can each have a diameter that is the same size. Rolling-element bearing cages according to these exemplary embodiments can then possibly serve for guiding of rolling elements in cylindrical bearings.

In some further exemplary embodiments the rolling-element bearing cage includes a closure element. The opening point can be closed or connected by the closure element. Thus a circumference of the side ring can be fixed after the mounting and the side ring or the rolling-element bearing cage can be held on the inner ring after the mounting. An unintended loosening of the rolling-element bearing cage from the inner ring can then possibly be avoided. For example, the side ring can comprise the closure element. Under certain circumstances each of the side rings can include its own closure element. Additionally or alternatively the closure element can be configured to simultaneously close the opening points of the side rings. For example, the closure element can be an adhesive-, weld-, solder-connection or the like.

The closure element can be configured releasable. Thus in some exemplary embodiments the rolling-element bearing cage can be easily removed again. In other words, the closure element could allow a non-destructive re-spreading or opening of the side ring on the opening side. For example, the closure element can be a screw-, rivet-, clip-, clamp-connection or the like.

In some further exemplary embodiments the opening point includes two ends. The ends overlap at least partially in the circumferential direction. This can be the case at least in a closed state of the side ring. Thus in some exemplary embodiments a sufficient surface for applying the closure element can be provided. For example, each of the ends can include a partial surface. In a closed state the two partial surfaces can contact. In an opened or spread state a space or a gap can possibly arise between the two partial surfaces. In some further exemplary embodiments the partial surfaces can also be configured such that in a closed state they have no contact to each other. The partial surfaces can then optionally fixed to each other via the connecting element.

Alternatively the partial surfaces can also bluntly abut on each other. This can possibly be the case in a closed state. In some exemplary embodiments the opening points can thereby be very easily produced. For example, the opening points could then be incorporated in the side ring as a simple cut. In other words, the opening point can be configured as a gap.

In some further exemplary embodiments at least one of the side rings includes a plurality of cutouts. The cutouts serve to receive the bridges. A bridge or an end of a bridge can be inserted in each of the cutouts. Thus in some exemplary embodiments the rolling-element bearing cage can be built from two side rings that are connected via bridges. According to some exemplary embodiments these individual parts can be manufactured in a simple manner. Since the side rings include the cutouts for receiving the bridges, in some exemplary embodiments a more stable rolling-element bearing cage can be provided. This could also be suited for large bearings. The plurality of the cutouts can be disposed, for example, on a radially outwardly directed circumferential surface of the side ring.

In some further exemplary embodiments the bridges are disposed bluntly between the side rings. The bridges here can be attached to a surface of the side ring. The surface can be directed, for example, in an axial direction and facing the other side ring. Thus in some exemplary embodiments an extension or an installation space of the rolling-element bearing cage in a radial direction can be kept as small as possible.

In some further exemplary embodiments, a method is provided of installing the aforementioned rolling-element bearing cage on a bearing inner ring having a first diameter at a first end. The method includes opening the first side ring at the opening point of the first side ring such that a diameter of an opening in the first side ring is greater than the first diameter, placing the first side ring over the first end of the bearing inner ring, and closing and securing the opening point.

In some further exemplary embodiments, a rolling-element bearing cage is provided that includes a first side ring and a second side ring connected to the first side ring by a plurality of bridges defining a plurality of pockets configured to receive a rolling-element. The first side ring includes a joint at which the first side ring is configured to be opened to increase a diameter of the first side ring, and the first ring and the second ring and the plurality of bridges are made of steel, and an outer diameter of the second bearing ring is greater than 500 mm.

A cross-section of the side ring can be L-shaped. Thus in some exemplary embodiments the side ring can include a larger slip- or running-surface for the bridges. The side ring can be configured such that the bridge receives an abutment surface in the axial direction on the side ring. Furthermore, the bridge can also receive an abutment surface in the radial direction on the side ring. Thus in some exemplary embodiments a more stable rolling-element bearing cage can be provided that is suited for guiding of rolling elements in large rolling-element bearings. In some further exemplary embodiments the side ring can have any cross-section. For example, the cross-section can be configured rectangular, square, quadrilateral, trapezoidal, polygonal, as a circular disc, as an annulus disc, or the like.

According to one aspect exemplary embodiments relate to a method. A rolling-element bearing cage can be installed with the method. For this purpose a side ring of the rolling-element bearing cage is opened at an opening point. Subsequently the opened rolling-element bearing cage is installed into the rolling-element bearing. After the installing of the rolling-element bearing cage in rolling-element bearing the side ring is closed. Since the side ring is opened for installation, in some exemplary embodiments the side ring can be mounted on an inner ring with a flange. In some cases this could occur without an expensive tool. To open the side ring the partial surfaces can be spread apart or drawn apart at the opening point.

Further advantageous embodiments are described in more detail below with reference to exemplary embodiments depicted in the drawings, but are not limited to said exemplary embodiments.

BRIEF DESCRIPTION OF THE DRAWINGS

The Figures thus schematically show the following views.

DETAILED DESCRIPTION OF THE PRESENT INVENTION

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

FIGS. 1 to 4 show different views of a rolling-element bearing cage with rolling elements in an opened state according to an exemplary embodiment on an inner ring of a rolling-element bearing.

Figure 1:
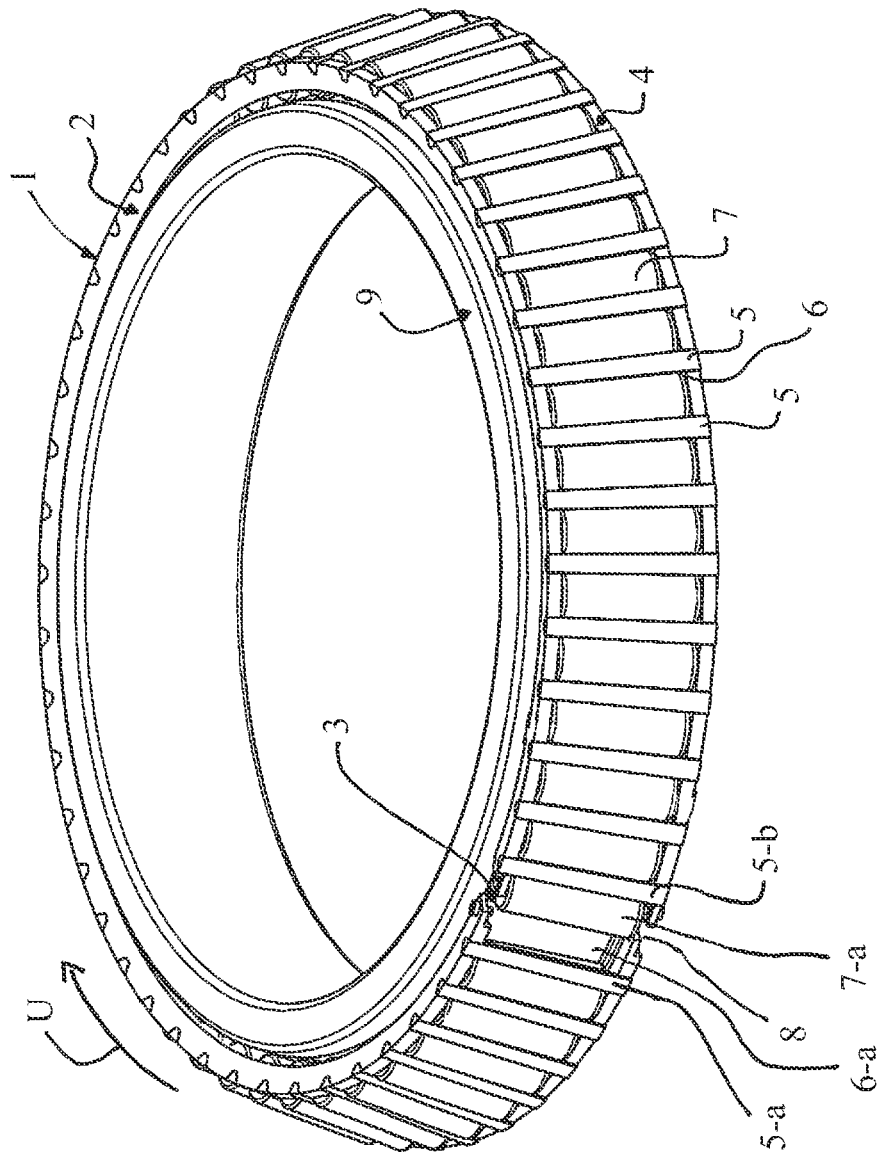
FIG. 1 shows a schematic depiction of a perspective view of a rolling-element bearing cage with rolling elements in an opened state according to an exemplary embodiment on an inner ring.

As depicted in FIG. 1, a rolling-element bearing cage 1 comprises a side ring 2. The side ring 2 extends in a circumferential direction U. The side ring 2 includes an opening point 3. The side ring 2 can be opened or separated at the opening point 3. A circumference of the side ring 2 is expanded during an opening or separating of the opening point 3. The side ring 2 is opened, for example for installation of the rolling-element bearing cage 1. The rolling-element bearing cage 1 is manufactured from steel and has a diameter that is greater than 500 mm.

The rolling-element bearing cage 1 comprises a second side ring 4. The second side ring 4 also extends in circumferential direction U. The first side ring 2 and the second side ring 4 are connected to each other via a plurality of bridges 5. A pocket 6 is formed between each two bridges 5, the side ring 2 and the second side ring 4. The pocket 6 serves for receiving a rolling element 7. In the exemplary embodiment of FIGS. 1 to 4 a rolling element 7 is received in each pocket 6 of the rolling-element bearing cage 1.

The rolling-element bearing cage 1 has a truncated cone as shape. A diameter of the second side ring 4 is configured larger than a diameter of the first side ring 2. The rolling-element bearing cage 1 is thus suited for guiding of rolling elements 7 that are tapered rollers. The rolling-element bearing cage 1 could thus be used in a tapered roller bearing.

In some further, not-depicted exemplary embodiments the rolling-element bearing cage can include side rings with identical or essentially identical diameters. In other words, the side rings can be the same size. For example, in some exemplary embodiments the rolling-element bearing cage can then be suited for the guiding of rolling elements that are cylindrical rollers.

The second side ring 4 also includes an opening point 8. The opening points 3 and 8 of the two side rings 2 and 4 are respectively disposed between the two adjacent bridges 5-a and 5-b. The rolling-element bearing cage 1 can thus be divided at a pocket 6-a. In other words, the two opening points 3 and 8 are located at the same angular position α. The angular position α is located here on an imaginary circle whose centerpoint is the central axis M of the rolling-element bearing cage 1. This can be seen in the plan view of FIG. 4. A rolling element 7-a is received in the pocket 6-a. The rolling element 7-a is disposed on the same side in circumferential direction U adjacent to the opening point 3 or 8.

Figure 2:
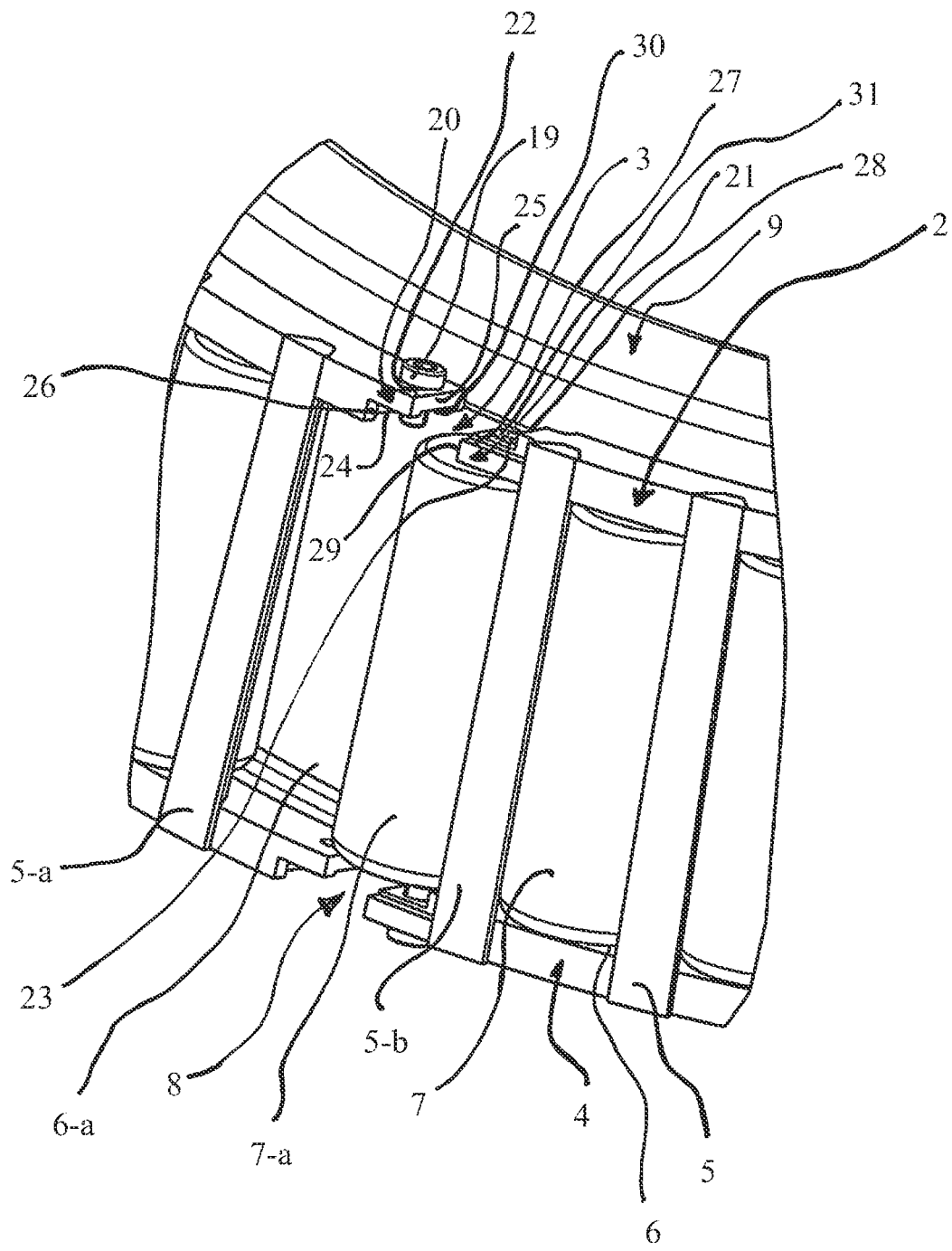
FIG. 2 shows a schematic depiction of an enlarged section of FIG. 1.

For installation in a rolling-element bearing the rolling-element bearing cage 1 is disposed on an inner ring 9. This is shown in FIG. 2. The inner ring 9 includes a cylindrical inner bore 10. The inner ring 9 and its bore 10 are oriented concentric to a central axis M of the rolling-element bearing cage. The inner ring 9 includes a radially outwardly directed circumferential surface 11. The inner ring 9 includes a conical raceway 12 on the circumferential surface 11. In an installed state the rolling elements 7 roll on the raceway 12. Furthermore, the inner ring 9 includes a flange 13. The flange 13 represents a boundary for the rolling elements 7 in an axial direction M. The flange 13 is located on an axial end of the inner ring 9. This end has a smaller diameter than an opposing end in the axial direction. At the opposing end in the axial direction with a larger diameter the inner ring 9 includes a flange 14. For installing the rolling-element bearing cage 1 the rolling elements 7 are already received in the rolling-element bearing cage 1 or the pockets 6. The rolling-element bearing cage 1 is opened for installation. For this purpose the side rings 2 and 4 are each drawn apart at the opening points 3 and 8. It can thus be made possible that the rolling-element bearing cage 1 and thus also the rolling elements 7 can be drawn over the flange 13 of the inner ring 9. Here the rolling-element bearing cage 1 is slipped over the inner ring 9 in a direction that extends from the flange 13 to the flange 14.

Figure 3:
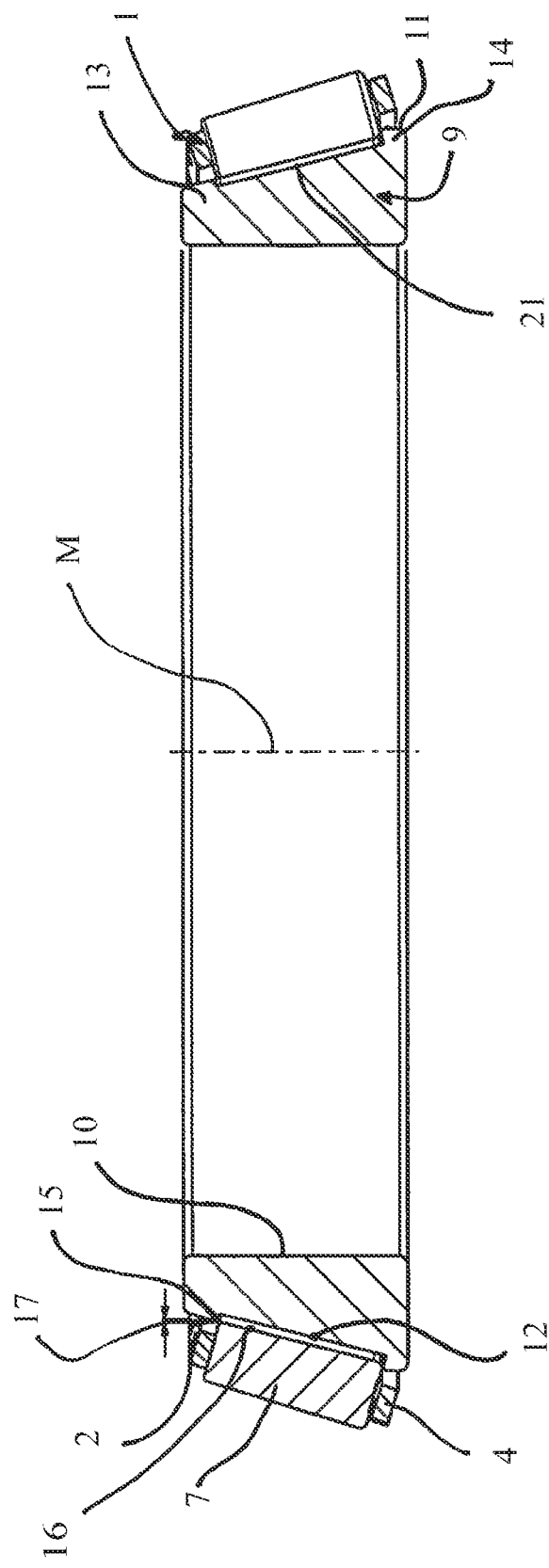
FIG. 3 shows a schematic depiction of a cut side view of the rolling-element bearing cage in an opened state on the inner ring according to FIG. 1.
Figure 4:
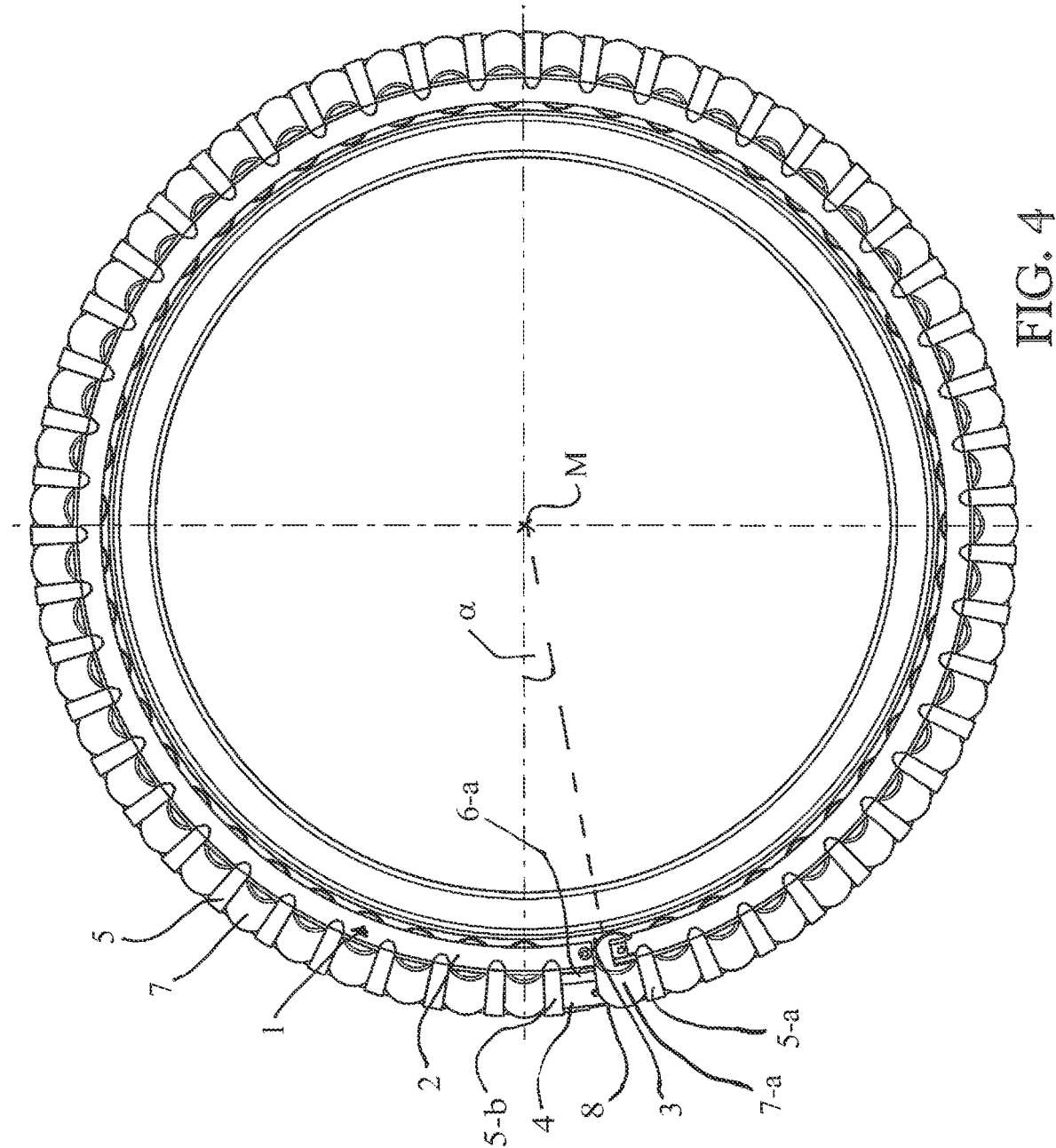
FIG. 4 shows a schematic depiction of a plan view of the rolling-element bearing cage in an opened state on the inner ring according to FIG. 1.
Figure 5:
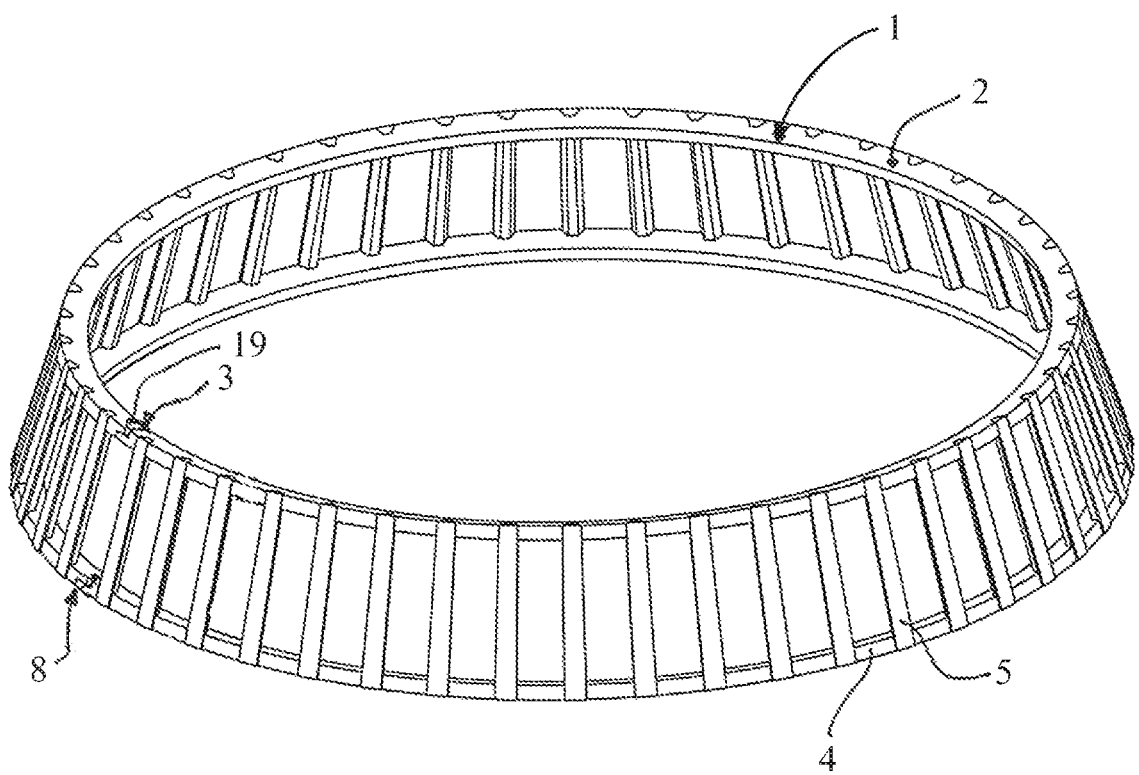
FIG. 5 shows a schematic depiction of a perspective view of the rolling-element bearing cage according to FIG. 1 in a closed state.
Figure 6:
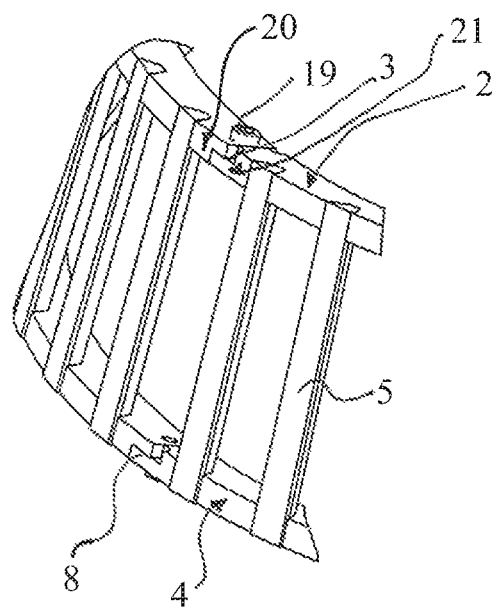
FIG. 6 shows a schematic depiction of an enlarged section of FIG. 5.
Figure 7:
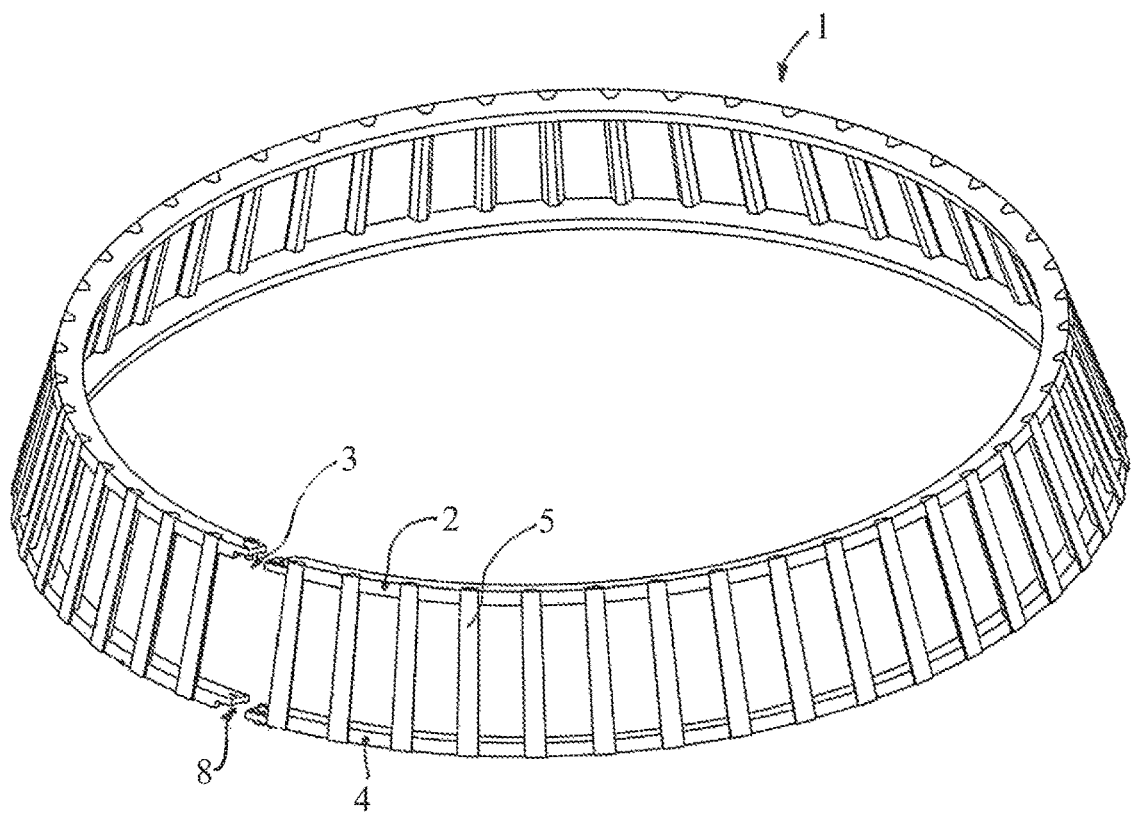
FIG. 7 shows a schematic depiction of a perspective view of the rolling-element bearing cage according to FIG. 5 in an opened state.
Figure 8:
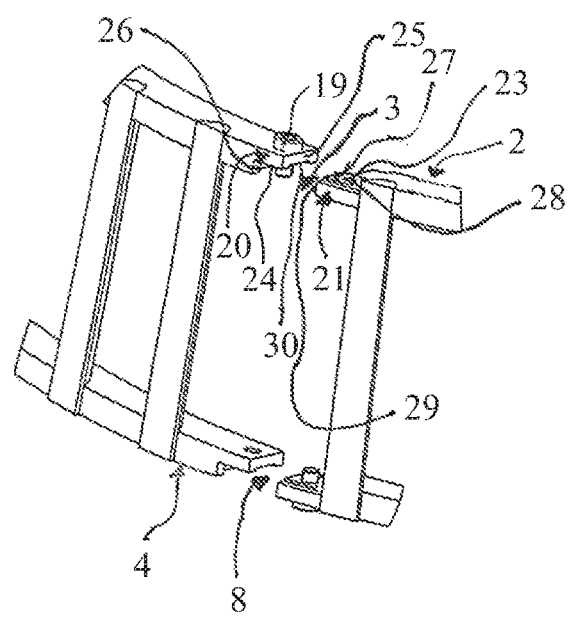
FIG. 8 shows a schematic depiction of an enlarged section of FIG. 7.

As can be seen in FIG. 3, there is a gap 17 between an edge 15 of the flange 13 facing the rolling elements 7 and a raceway 16 of the rolling elements 7. FIG. 3 shows a situation wherein the rolling-element bearing cage is not yet closed again at the opening points 3 and 8. In an opened state of the side rings 2 and 4 it is possible that the raceways 16 of the rolling elements 7 lie at a larger diameter than a radially outwardly oriented edge 15 of the flange 13. Thus in the exemplary embodiment of the Figures the rolling-element bearing cage 1 can be mounted on the inner ring 9.

In some further, not-depicted exemplary embodiments only the first side ring may include the opening point. Since the second side ring has a larger diameter than the flange, the rolling-element bearing cage could nonetheless be mounted on the inner ring.

After the positioning on the inner ring the rolling-element bearing cage 1 is closed. For this purpose the side rings 2 are joined together again at their opening point 3. In an analogous manner the side rings 4 are also joined together again at their opening point 8. This can occur, for example, by a force with which the side rings 2 and 4 have been spread being removed again. Additionally or alternatively the side rings 2 and 4 can also be pressed together so that they close.

In some further, not-depicted exemplary embodiments an outer ring of the rolling-element bearing can subsequently be mounted.

FIGS. 5 to 8 show different depictions of the rolling-element bearing cage 1 in closed and open states. For the sake of clarity the rolling elements and the inner ring are hidden.

Figure 9:
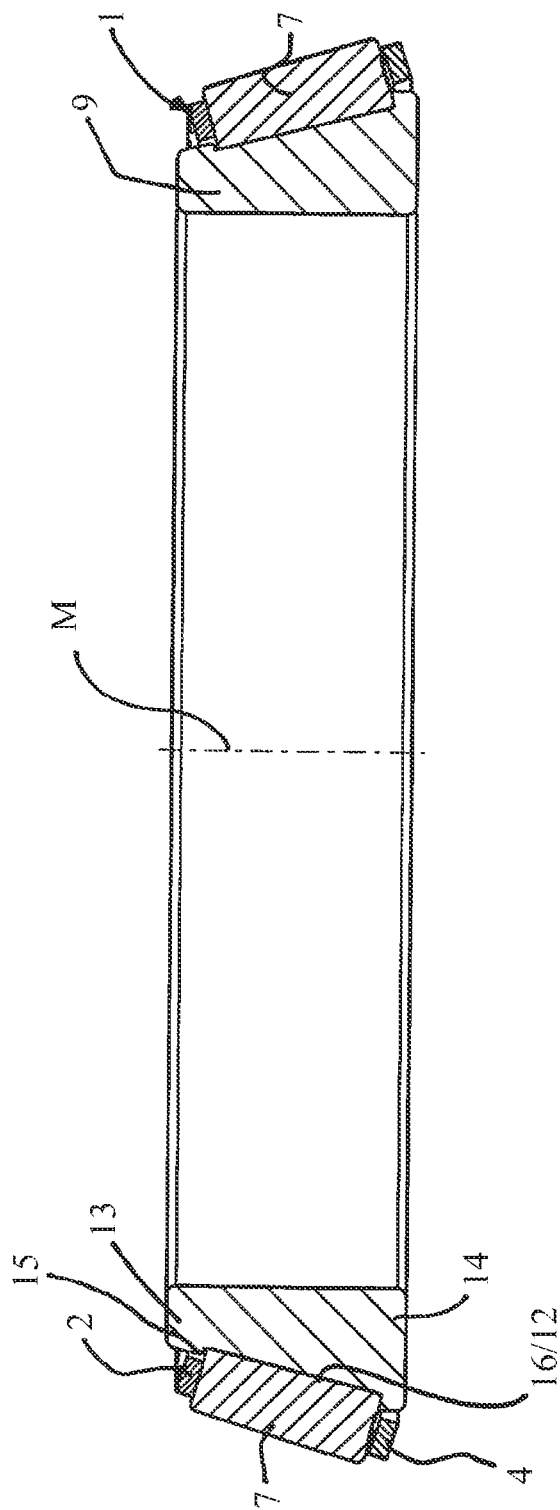
FIG. 9 shows a schematic depiction of a cut side view of the rolling-element bearing cage with rolling elements according to FIG. 1 in a closed state on the inner ring.

FIG. 9 shows a schematic depiction of a cut side view of the rolling-element bearing cage 1 with rolling elements 7 according to FIG. 1 in a closed state on the inner ring 9.

By the joining together, closing, or sealing of the side rings 2 and 4 the side rings 2 and 4 can each assume their original circumference again. They need this for their function in the bearing. If the side rings 2 and 4 are each sealed at their opening points 3 and 8, the circumference of the rolling-element bearing cage 1 shrinks. In the closed state shown in FIG. 9 no more gap is present between the flange 15 and the raceway 16 of the rolling elements 7. After the closing of the side rings 2 and 4 the rolling elements 7 abut with their raceways 16 on the raceway 12 of the inner ring 9. The rolling elements 7 can now be held on an inner diameter that is smaller than an inner diameter of the flange 13 on which the edge 15 lies. Thus in some exemplary embodiments it can optionally be prevented that the rolling elements 7 and also the rolling-element bearing cage 1 can slide from the inner ring 9 in the axial direction.

Figure 10:
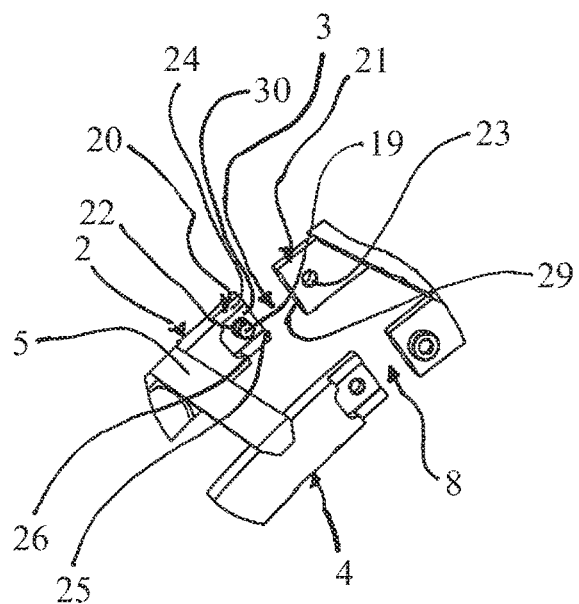
FIG. 10 shows a schematic depiction of an enlarged section of a perspective view of the rolling-element bearing cage from the front in an opened state according to an exemplary embodiment.
Figure 11:
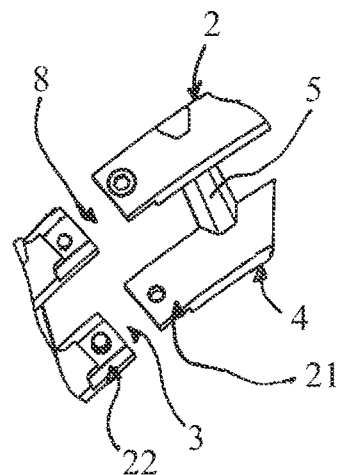
FIG. 11 shows a schematic depiction of a section of a perspective view of the rolling-element bearing cage of FIG. 10 from behind.
Figure 12:
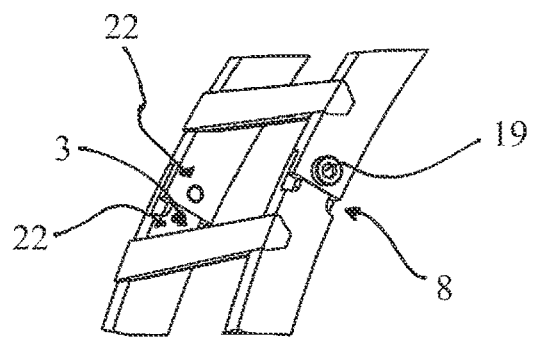
FIG. 12 shows a schematic depiction of a section of a perspective view of the rolling-element bearing cage of FIG. 10 in a closed state.

FIGS. 10 to 12 show different perspective views of the opening points 3 and 8 of the rolling-element bearing cage 1. The opening points 3 and 8 are configured in an essentially analogous manner. This can be seen in the enlarged views of FIGS. 2, 6, 8, 10, 11, and 12. Therefore in the following only the design of the opening point 3 is described with reference to FIG. 2.

At the opening point 3 the side ring 2 includes a first end 20 and a second end 21. The ends 20 and 21 oppose each other in the circumferential direction U. The first end 20 includes a bore 22. The bore 22 serves for receiving a connecting element 19. The second end 21 also includes a bore 23. The bore 23 also serves for receiving the connecting element 19. In the exemplary embodiment of FIG. 2 the connecting element 19 is a screw. Screws are mechanical fasteners comprising an elongated connecting element. The bore 22 and/or the bore 23 can include a thread as a counterstructure for the connecting element 19. Additionally or alternatively the connecting element 19 can also interact with a not-depicted nut.

The first end 20 and the second end 21 are configured such that they at least partially overlap in circumferential direction U at least in a closed state of the side ring 2. This is recognizable, for example, in the detail view in FIG. 6. The first end 20 includes an overlap surface 24. The overlap surface 24 is directed in an axial direction M of the rolling-element bearing cage 1. The overlap surface 24 faces the side ring 4. The second end 21 correspondingly includes an overlap surface 27. The overlap surface 27 is directed in an axial direction M of the rolling-element bearing cage 1. The overlap surface 27 is located on a side of the end 21 facing away from the side ring 4. The overlap surfaces 25 and 27 are configured such that in a closed state they can contact at least sectionally. In some further exemplary embodiments the ends can also be configured other than described. For example, contrary to the described exemplary embodiment the ends can overlap.

Furthermore, the first end 20 includes an abutment surface 25. The abutment surface 25 is directed in a circumferential direction U. The abutment surface 25 represents the element of the first end 20 protruding farthest in the circumferential direction toward the second end 21. The first end 20 includes a further abutment surface 26. The abutment surface 26 is disposed set back in the circumferential direction U with respect to the second end 21. The abutment surface 26 is located on an end of the overlap surface 24 opposing the abutment surface 25 in the circumferential direction U. The abutment surfaces 25 and 26 both extend in an axial direction but protrude in opposing directions from the overlap surface 24. The abutment surface 26 and the overlap surface 24 can arise, for example, in a manufacturing of the opening point 3. For this purpose, for example, an essentially Z-shaped cut can be introduced in the side ring 2. Here the arms of the Z-shaped cut can have, for example, right angles with respect to one another. The second end 21 correspondingly includes the described overlap surface 27.

Also with the second end 21 two abutment surfaces 28 and 29 protrude from the overlap surface. The abutment surface 28 is directed in circumferential direction U. It is located on an end of the overlap surface 27 facing away from the first end 20 in circumferential direction U. In a closed state the abutment surface 28 can abut on the abutment surface 25. The abutment surface 29 is directed in circumferential direction U. The abutment surface 29 represents the element of the second end 21 pointing farthest in the circumferential direction toward the second end 21. In a closed state of the side ring 2 the abutment surface 29 can abut on the abutment surface 26. The abutment surfaces 25 and 26 and 28 and 29 represent a radial stop of the opening point 3 or of a closing function of the side ring. Furthermore a groove 30 is introduced into the overlap surface 24. The groove 30 extends in circumferential direction U. The overlap surface 27 correspondingly includes a shoulder 31. The shoulder 31 also extends in circumferential direction U. The shoulder 31 is configured such that it can be received in the groove 30. In other words, the ends 20 and 21 of the opening position 3 are interference-fit connecting elements. Thus in some exemplary embodiments a better positioning of the ends 20 and 21 with respect to each other can be made possible. The ends 21 and 22 can be screwed with the connecting element 19.

In further, not-depicted exemplary embodiments the ends can be configured in another manner. For example, the ends can be configured without groove or shoulder. Additionally or alternatively the overlap surfaces or the partial surfaces can enclose an angle other than 90°.

In other, not depicted exemplary embodiments the ends can also be connected using a blunt connection type, i.e., not overlapping. For this purpose the two ends can be connected to each other in any manner. For example, the ends can be connected using a screw connection, a weld connection, a solder connection, or the like. The screw connection can be configured, for example, as a lockable or locked union nut, nut, or sleeve. In other words, a closure function is provided on the opening point or this includes a closure function.

Figure 13:
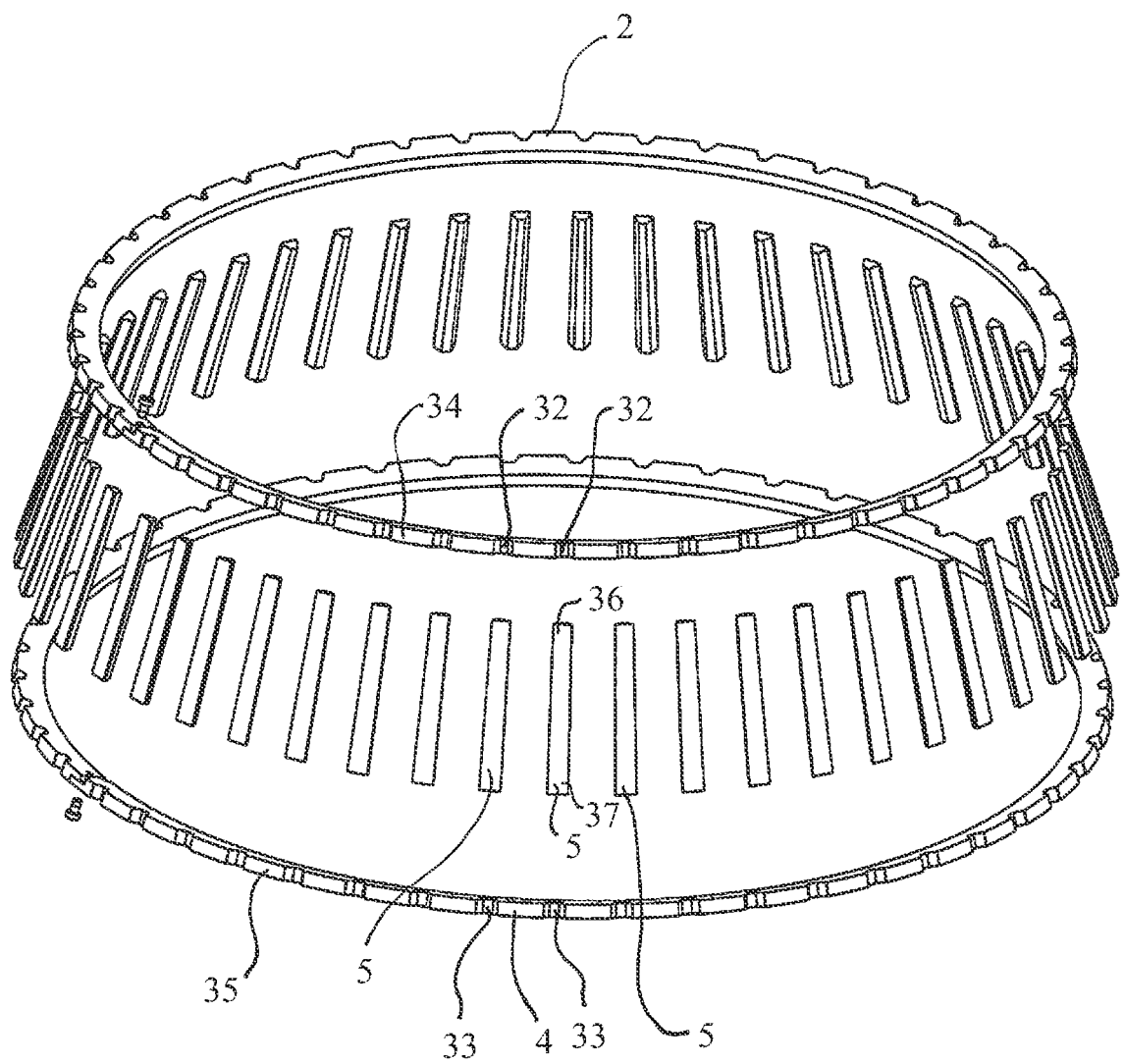
FIG. 13 shows a schematic depiction of an exploded view of the rolling-element bearing cage according to an exemplary embodiment.

FIG. 13 shows a schematic depiction of an exploded view of the rolling-element bearing cage according to an exemplary embodiment.

As shown in FIG. 13 the side ring 2 includes a plurality of recesses 32. The side ring 4 correspondingly also includes a plurality of recesses 33. The side ring 2 includes a radially outwardly directed circumferential surface 34. The recesses 32 are introduced from this circumferential surface 34 in the side rings 2. The side ring 4 also includes a radially outwardly directed circumferential surface 35. The recesses 33 are introduced from the circumferential surface 35 in the side ring 4. A recess 32 of the first side ring 2 and a recess 33 of the second side ring 4 are respectively introduced at the same angular position of the rolling-element bearing cage 1. The recesses 32 and 33 respectively serve for receiving an end 36 or 37 of a bridge 5. Thus in some exemplary embodiments a better or more stable connection can be made possible between the bridges 5 and the side rings 2 or 4. The recesses 32 and 35 have a trapezoidal cross-section. In an analogous manner the bridges 5 also have a trapezoidal cross-section.

In some further, not-depicted exemplary embodiments the plurality of recesses can also be formed on a radially inwardly directed circumferential surface of the side ring.

In further, not-depicted exemplary embodiments the bridges can have any cross-section. The cross-section can, for example, be configured square, rectangular, quadrilateral, polygonal, triangular, round, as a circular disc, as an annulus disc, or the like. For example, the bridges can be manufactured from a solid material. The recesses can be configured such that they can receive the bridge. For example, the recesses can have a cross-section that corresponds to a shape of the bridge. In further, not-depicted exemplary embodiments the bridges can be attached to the side rings in another manner. The side rings can then optionally have no cutout. For example, the bridges can be attached bluntly to the side rings. In some exemplary embodiments the side rings can be manufactured cost-effectively without great effort. For example, the side rings can by manufactured by rolling of a flat material or as turned parts. In some further, not depicted exemplary embodiments the side rings and bridges can also be formed one-piece. For example, the pockets can be punched from a band.

Figure 14:
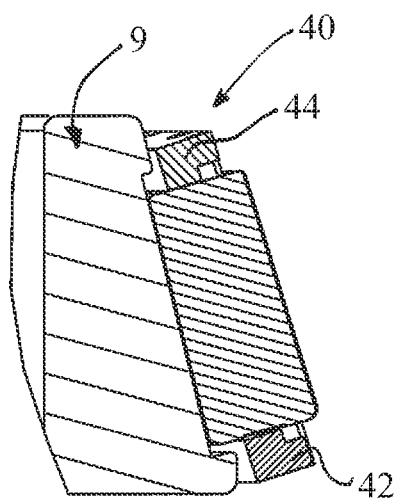
FIG. 14 shows a schematic depiction of a section of a cut side view of a rolling-element bearing cage with rolling elements on an inner ring according to a further exemplary embodiment.
Figure 15:
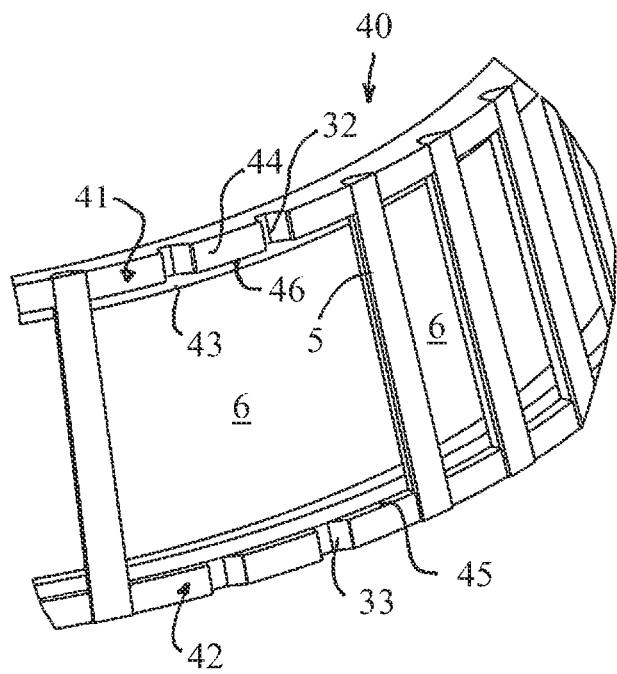
FIG. 15 shows a schematic depiction of a section of a perspective view of the rolling-element bearing cage according to the exemplary embodiment of FIG. 14.
Figure 16:
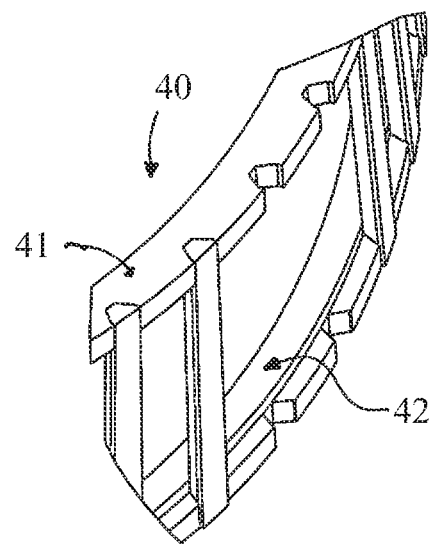
FIG. 16 shows a schematic depiction of a section of a further perspective view of the rolling-element bearing cage according to the exemplary embodiment of FIGS. 14 and 15.

FIGS. 14, 15, and 16 show different schematic depictions of a rolling-element bearing cage according to a further exemplary embodiment.

As depicted in FIG. 14 a rolling-element bearing cage 40 is disposed on an inner ring 9. The rolling-element bearing cage 40 is configured in an essentially analogous manner to the rolling-element bearing cage 1. The rolling-element bearing cage 40 includes a first side ring 41 and a second side ring 42. The rolling-element bearing cage 40 differs from the rolling-element bearing cage 1 in the formation of the side rings 41 and 42. The side rings 41 and 42 are configured in an essentially analogous manner to the side rings 2 and 4. In contrast to the side rings 2 and 4 the side rings 41 and 42 each have an L-shaped cross-section. In other words the side ring 41 includes an abutment surface 43 as is recognizable in FIGS. 15 and 16. The abutment surface 43 protrudes from the side ring 41. It extends to the side ring 42. The abutment surface 43 thus extends from the side ring 41 out into the pocket 6. Furthermore, the abutment surface 43 has a smaller extension in a radially outward direction than the side ring 41 or a main part 44 of the side ring. Thus the abutment surface 43 forms an enlarged abutment surface for the bridges. Thus, for example, an improved supporting can be made possible for the bridges 5 by an L-extension on the side ring.

For the sake of clarity some bridges are hidden in FIGS. 15 and 16. In an analogous manner to the side rings 2 and 4 the side rings 41 and 42 also have corresponding recesses 32 and 33 for receiving the bridges 5.

In some further, not-depicted exemplary embodiments the side rings with the L-shaped cross-section can also be configured, for example, without the recesses. The bridges can then be, for example, only so long that they can be introduced between the side rings. This length can correspond, for example, to a distance between a side surface 45 of the side ring 42 and a side surface 46 of the side ring 41. The side surfaces 45 and 46 here can each be directed in an axial direction M and facing each other. The side surfaces 45 and 46 here can also form boundary surfaces for the pockets 6. Since the side rings 41 and 42 have an L-shaped cross-section, in some exemplary embodiments, for example, a more favorable axial abutment surface for the rolling elements or rollers can be provided.

Figure 17:
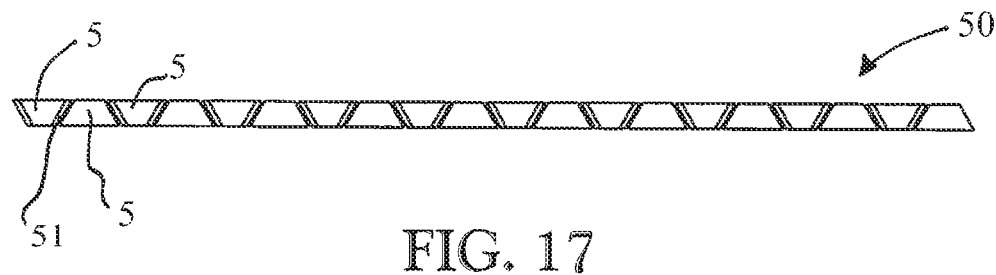
FIG. 17 shows a schematic depiction of a side view of a metal strip including a cutting gap for producing the bridge of the rolling-element bearing cage according to an exemplary embodiment.
Figure 18:
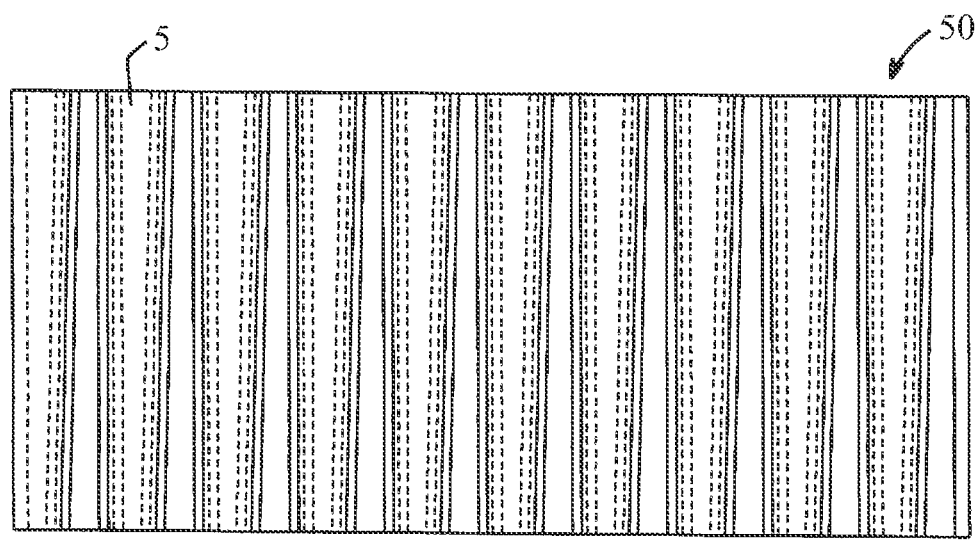
FIG. 18 shows a schematic depiction of a plan view of the metal strip according to FIG. 17.
Figure 19:
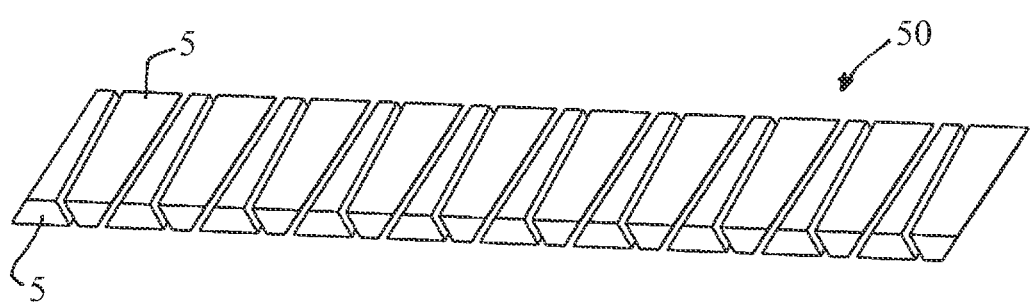
FIG. 19 shows a schematic depiction of a perspective view of the metal strip of FIGS. 17 and 18.

FIGS. 17, 18, and 19 show different schematic depictions of a metal strip with a cutting gap for producing the bridges of the rolling-element bearing cage according to an exemplary embodiment.

The bridges 5 are produced from a metal strip 50 shown in FIG. 17. For this purpose the metal strip 50 can be cut, for example, with a water-, laser-jet or an erosion wire. With a longitudinal cut a bridge 5 can be separated from the metal strip 50. In some exemplary embodiments only one cut is necessary for this purpose. This may be possible since at the same time a roller-abutment surface, rotated by 180°, of the adjacent bridge 5 is also cut. In other words the bridges 5 can have a shape that allows that the bridges 5 can be cut from the metal strip 50 without waste material. In some exemplary embodiments the bridges 5 can thereby be cost-effectively manufactured with a water-jet-, laser-cut-, or erosion-method. A cutting gap 51 can be seen in FIG. 17. The cutting gap 51 respectively separates two adjacent bridges 5.

In other words the rolling-element bearing cage 1 and also the rolling-element bearing cage 40 comprise an upper and a lower side ring 2, 4 or 41, 42. The bridges 5 or bridge segments are attached bluntly or in bridge-shaped cut-out recesses to these side rings, for example with a detachable or permanent connecting method. Examples of such methods are welding, riveting, screwing, adhering, soldering, or the like. The feature of the rolling-element bearing cages 1 and 40 is the radially separated side rings 2 and 4 or 41 and 42. In some exemplary embodiments these can be bent open for mounting of the rolling-element bearing cage 1 or 40 over the flange 13 or inner-ring flange. Then the roller and cage assembly or rolling-element bearing cage 1 or 40 goes over the inner-ring flange 13. The side rings 2 and 4 or 41 and 42 can subsequently be radially closed. In some exemplary embodiments the side rings 2, 4, or 41 and 42 can even produce a slight compensation of the radial clearance.

Figure 20:
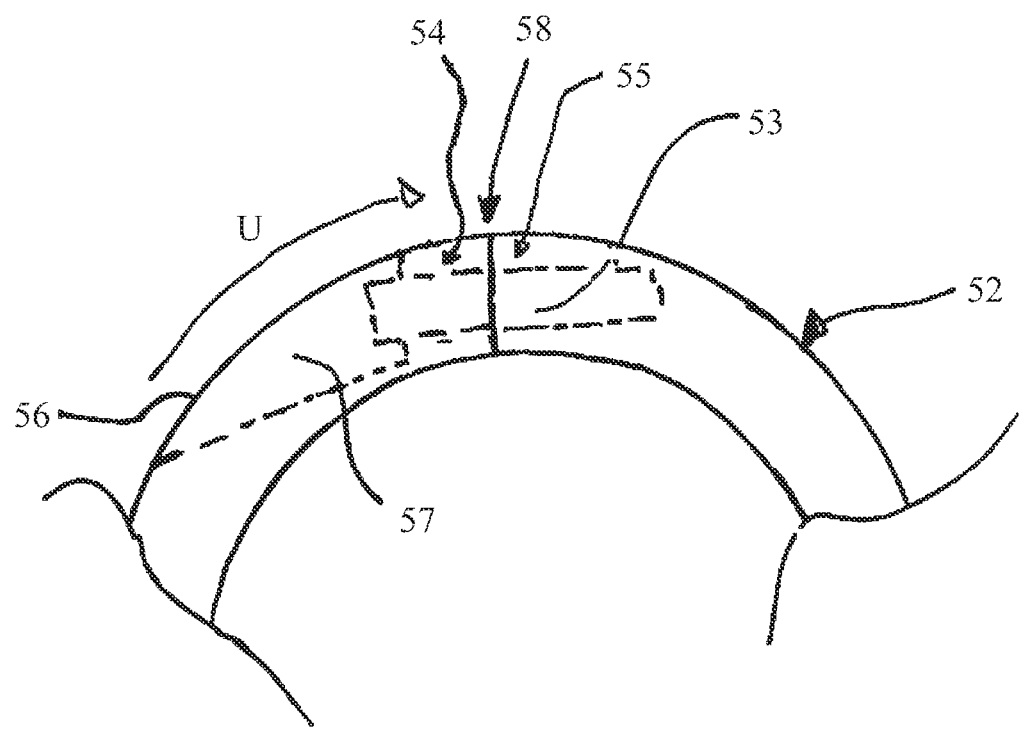
FIG. 20 shows a schematic depiction of a side view of a side ring of a rolling-element bearing cage according to a further exemplary embodiment.

FIG. 20 shows a schematic depiction of a side view of a side ring of a rolling-element bearing cage according to a further exemplary embodiment.

FIG. 20 shows a side ring 52 with an opening point 58. The opening point 58 separates a first end 54 from a second end 55. The ends 54 and 55 are opposingly disposed in the circumferential direction U and bluntly abut on each other. The side ring 52 further comprises a closure element 53. The closure element 53 is disposed such that it connects the end 54 and the end 55 of the side ring 52 to each other in the circumferential direction. For this purpose an opening 57 is introduced in the side ring 52 from a radially outwardly directed circumferential surface 56 of the side ring 52. From this opening 57 outward the closure element 53 can be inserted through the end 54 into the end 55. For example, for this purpose the end 55 can also already include a bore. Conventional closure mechanisms can optionally also be fallen back on as closure element 53 or closure mechanism. In some exemplary embodiments the closure element 53 is configured to connect the side ring 52 to the opening point 58 outward from a radially outwardly oriented circumferential surface 56.

In some exemplary embodiments the material- and manufacturing costs can be significantly reduced by the design of the rolling-element bearing cage 1 or 40. Furthermore, in some exemplary embodiments expensive pressure tools or complex manufacturing methods can be omitted. In some of these conventional manufacturing methods blanks for steel-plate cages for large bearings are manufactured, for example, by flow forming. Pockets and a bore are subsequently introduced in a pot base by laser-cutting. Laser-cutting is often used because in some conventional solutions a punching pocket-manufacturing is only possible up to approximately 1100 mm. With a laser method, in some exemplary embodiments metal plates with a thickness of up to 10 mm and an outer diameter of up to 1300 mm can be treated or worked. Thus some conventional bearing cages are manufactured by machining (e.g., milling). These manufacturing methods can be very time-consuming and possibly require a five-axis milling machine. In other words, a steel-cage construction for bearings with an outer diameter of up to 3000 mm or more can be provided with the rolling-element bearing cage 1 or 40. In other exemplary embodiments the rolling-element bearing cage 1 or 40 can also have other dimensions. With the rolling-element bearing cage 1 or 40 as steel-cage construction at least the side rings and the bridges can be manufactured from steel. The rolling-element bearing cage can possibly be manufactured completely from steel.

Furthermore, in some exemplary embodiments complex installation methods can be omitted. This can be the case above all compared to conventional solutions wherein a pattern inner ring with a decreasable flange is manufactured in order to simulate snap-in installation with the pocket manufacturing. Difficult-to-handle components or a difficult-to-handle pattern inner ring are often present in these conventional solutions.

With the rolling-element bearing cage according to some exemplary embodiments, an installation and a manufacturing can be simplified, for example, particularly with large bearings. Nevertheless, however, the rolling-element bearing cage according to some exemplary embodiment can not only be used for large bearings as described for the exemplary embodiments. The rolling-element bearing cage according to some exemplary embodiments can be suited, for example, for any bearing size and bearing type. In some exemplary embodiments a side-ring shape, bridge shape, or side-ring- and bridge-design can be adapted according to the bearing type and a rolling-element shape. The embodiment of a radially opened cage can be useful, for example, in any cage-variant and -shape, in particular in the installation.

In other words, according to some exemplary embodiments the rolling-element bearing cage includes a gap or is configured as a gap cage.

The exemplary embodiments and their individual features disclosed in the above description, the following claims, and the accompanying Figures can be meaningful and implemented both individually and in any combination for the realization of an exemplary embodiment in its various designs.

In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

REFERENCE NUMBER LIST

1 Rolling-element bearing cage
2 First side ring
3 Opening point
4 Second side ring
5 Bridge
6 Pocket
7 Rolling element
8 Opening point
9 Inner ring
10 Inner bore
11 Circumferential surface
12 Raceway
13 Flange
14 Flange
15 Edge
16 Raceway
17 Gap
19 Closure element
20 First end
21 Second end
22 Bore
23 Bore
24 Overlapping surface
25 Abutment surface
26 Abutment surface
27 Overlapping surface
28 Abutment surface
29 Abutment surface
30 Groove
31 Shoulder
32 Recess
33 Recess
34 Circumferential surface
35 Circumferential surface
36 Bridge end
37 Bridge end
40 Rolling-element bearing cage
41 First side ring
42 Second side ring
43 Abutment surface
44 Main part
45 Side surface
46 Side surface
50 Metal strip
51 Cutting gap
52 Side ring
53 Closure element
54 End
55 End
56 Circumferential surface
57 Opening
58 Opening point
α Angular position
M Axial direction
U Circumferential direction

The invention claimed is:

1. A rolling-element bearing cage having at least one first side ring extending in a circumferential direction, which includes an opening point at which the first side ring is configured to be opened to expand a circumference of the first side ring, and a closure element, wherein the rolling-element bearing cage comprises steel and has an outer diameter greater than 500 mm, wherein the opening point includes:
a first overlap surface formed on an L-shaped first end of the first side ring,
a second overlap surface formed on an L-shaped second end of the first side ring,
wherein the first overlap surface and the second overlap surface are arranged facing one another in an axial direction,
wherein the first overlap surface and the second overlap surface engage with one another in an overlapping arrangement,
wherein the opening point enables opening and closing in a circumferential direction, and
wherein the closure element is configured to hold the opening point closed so that a circumference of the side ring is fixed.

2. The rolling-element bearing cage according to claim 1, comprising a second side ring extending in the circumferential direction, which includes an opening point, at which the second side ring is configured to be opened to expand a circumference of the second side ring.

3. The rolling-element bearing cage according to claim 2, wherein the opening point of the first side ring and the opening point of the second side ring are axially disposed at a same angular position of the side rings.

4. The rolling-element bearing cage according to claim 3, wherein the closure element is releasable, and
wherein the second side ring has a larger diameter than the first side ring.

5. The rolling-element bearing cage according to claim 2, wherein the second side ring has a larger diameter than the first side ring.

6. The rolling-element bearing cage according to claim 2, wherein at least one of the first side ring and the second side ring includes a plurality of cutouts into which a plurality of bridges are inserted.

7. The rolling-element bearing cage according to claim 1, wherein the connecting element is releasable.

8. The rolling-element bearing cage according to claim 1, the first overlap surface further comprising a groove extending in a circumferential direction and the second overlap surface further comprising a shoulder, where the shoulder is received in the groove when the first overlap surface and the second overlap surface engage with one another in the overlapping arrangement.

9. A method of installing the rolling-element bearing cage according to claim 1 on a bearing inner ring having a first diameter at a first end, the method comprising:
opening the first side ring at the opening point of the first side ring such that a diameter of an opening in the first side ring becomes greater than the first diameter;
placing the first side ring over the first end of the bearing inner ring; and
closing and securing the opening point.

10. A method for installing a rolling-element bearing cage comprising:
a) opening a side ring of the rolling-element bearing cage at an opening point in a circumferential direction, wherein the opening point includes:
a first overlap surface formed on an L-shaped first end of the first side ring,
a second overlap surface formed on an L-shaped second end of the first side ring, and a closure element configured to hold the opening point in the first side ring closed, wherein the first overlap surface and the second overlap surface are arranged facing one another in an axial direction, wherein the first overlap surface and the second overlap surface engage with one another in an overlapping arrangement, and wherein the opening point enables opening and closing in a circumferential direction;

b) installing the rolling-element bearing cage with the opened side ring onto a rolling-element bearing; and c) closing and securing the opening point by bringing the first end of the first side ring and the second end of the first side ring towards one another in a circumferential motion, overlapping the first overlap surface and the second overlap surface in an overlapping arrangement, and d) securing the first overlap surface and the second overlap surface in an overlapping arrangement and in a fixed arrangement using the closure element.

11. The method for installing a rolling-element bearing cage according to claim 10, wherein the closure element is a releasable closure element.

12. A rolling-element bearing cage comprising a first side ring and a second side ring connected to the first side ring by a plurality of bridges defining a plurality of pockets configured to receive a rolling-element, and a closure element, wherein the first side ring includes a joint at which the first side ring is configured to be opened to increase a diameter of the first side ring, and wherein the first side ring and the second side ring and the plurality of bridges are separate elements having a first end of each bridge assembled to the first side ring and a second end of each bridge assembled to the second side ring, the first side ring, the second side ring and the plurality of bridges comprise steel and wherein an outer diameter of the second side ring is greater than 500 mm, wherein the joint includes:
a first overlap surface formed on an L-shaped first end of the first side ring,
a second overlap surface formed on an L-shaped second end of the first side ring,
wherein the first overlap surface and the second overlap surface are arranged facing one another in an axial direction,
wherein the first overlap surface and the second overlap surface engage with one another in an overlapping arrangement,
wherein the closure element is configured to hold the opening point closed so that a circumference of the side ring is fixed, and
wherein the joint enables opening and closing in a circumferential direction.

13. The rolling-element bearing cage according to claim 12, wherein the second side ring includes a joint configured to be opened to increase a diameter of the second side ring.

14. The rolling-element bearing cage according to claim 13, wherein the joint of the second side ring is axially aligned with the joint of the first side ring.

15. The rolling-element bearing cage according to claim 12, wherein the closure element is a mechanical fastener.

16. The rolling-element bearing cage according to claim 12, wherein the closure element is releasable.

* * * * *